United States Patent [19]

Suzuki

[11] Patent Number: 4,675,745
[45] Date of Patent: Jun. 23, 1987

[54] IMAGE READING APPARATUS

[75] Inventor: Yoshiyuki Suzuki, Yokohama, Japan

[73] Assignee: Canon Kabushiki Kaisha, Tokyo, Japan

[21] Appl. No.: 650,266

[22] Filed: Sep. 13, 1984

[30] Foreign Application Priority Data

Sep. 19, 1983 [JP] Japan ................. 58-171082
Sep. 19, 1983 [JP] Japan ................. 58-171083

[51] Int. Cl.$^4$ .............. H04N 1/04; H04N 1/10; H04N 1/40
[52] U.S. Cl. .............. 358/285; 358/293; 358/294; 250/578
[58] Field of Search .............. 358/285, 293, 294; 250/578; 382/67

[56] References Cited

U.S. PATENT DOCUMENTS

| | | | |
|---|---|---|---|
| 4,149,090 | 4/1979 | Agulnek | 358/293 |
| 4,321,628 | 3/1982 | Crean | 358/285 |
| 4,337,394 | 6/1982 | Fukushima | 250/578 |
| 4,358,794 | 11/1982 | Kurakami et al. | 358/294 |
| 4,370,641 | 1/1983 | Kantor et al. | 250/578 |
| 4,439,790 | 3/1984 | Yoshida | 358/293 |
| 4,449,151 | 5/1984 | Yokota et al. | 358/293 |
| 4,459,619 | 7/1984 | Yoshida | 358/293 |
| 4,464,681 | 8/1984 | Jacobs et al. | 358/294 |
| 4,465,939 | 8/1984 | Tamura | 358/294 |

Primary Examiner—Howard W. Britton
Assistant Examiner—John K. Peng
Attorney, Agent, or Firm—Fitzpatrick, Cella, Harper & Scinto

[57] ABSTRACT

An image reading apparatus has more than one CCD for reading an image, the CCDs or other sensors partly overlapping to form an overlapped reading region. A mark such as a thin black line is used for discriminating the overlapped reading region, a liquid crystal device is provided for displaying the determined overlapped reading region, and a joint correction circuit is provided for correcting image data. Overlap or drop of image data is prevented.

26 Claims, 24 Drawing Figures

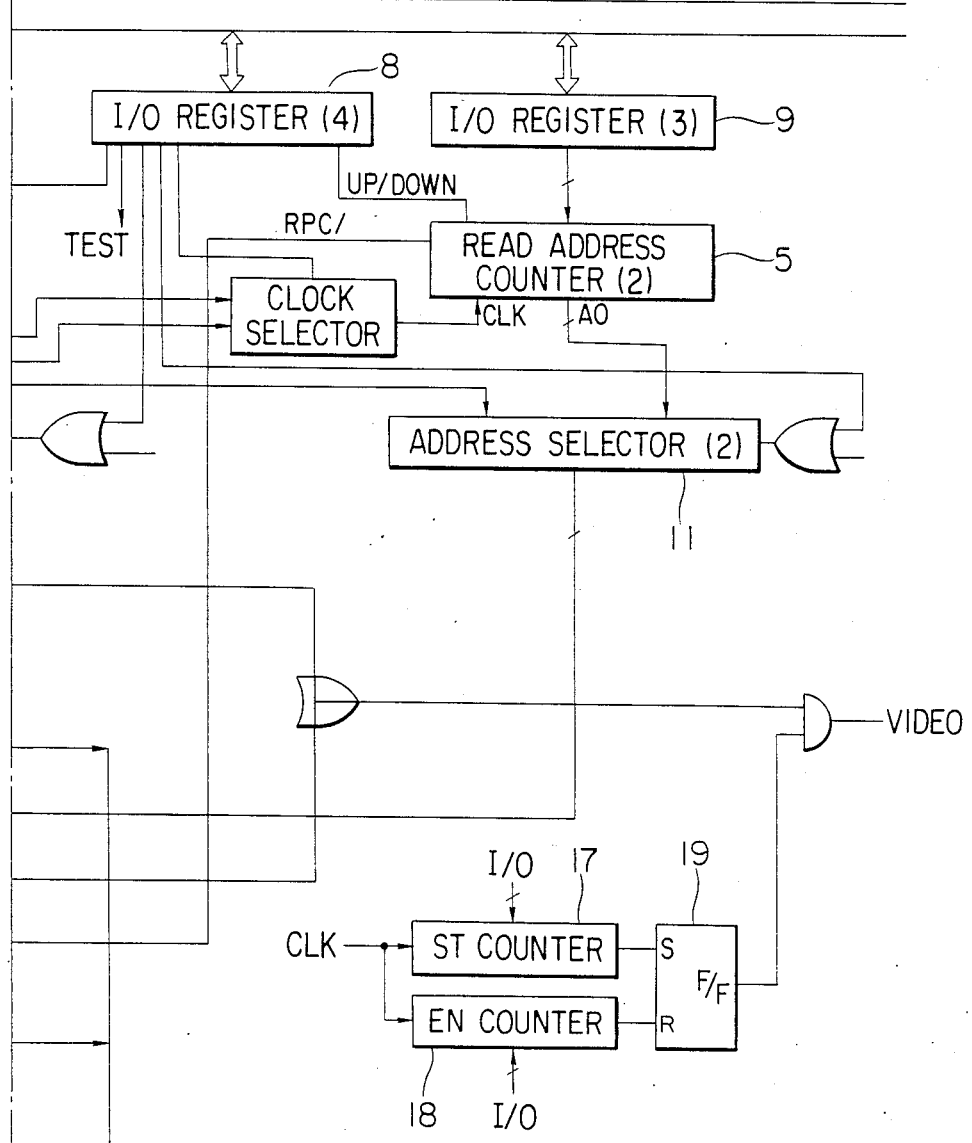

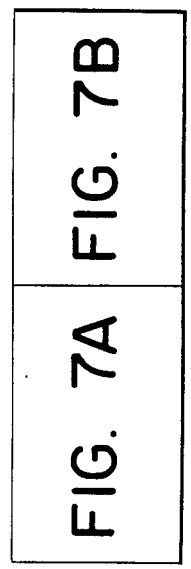
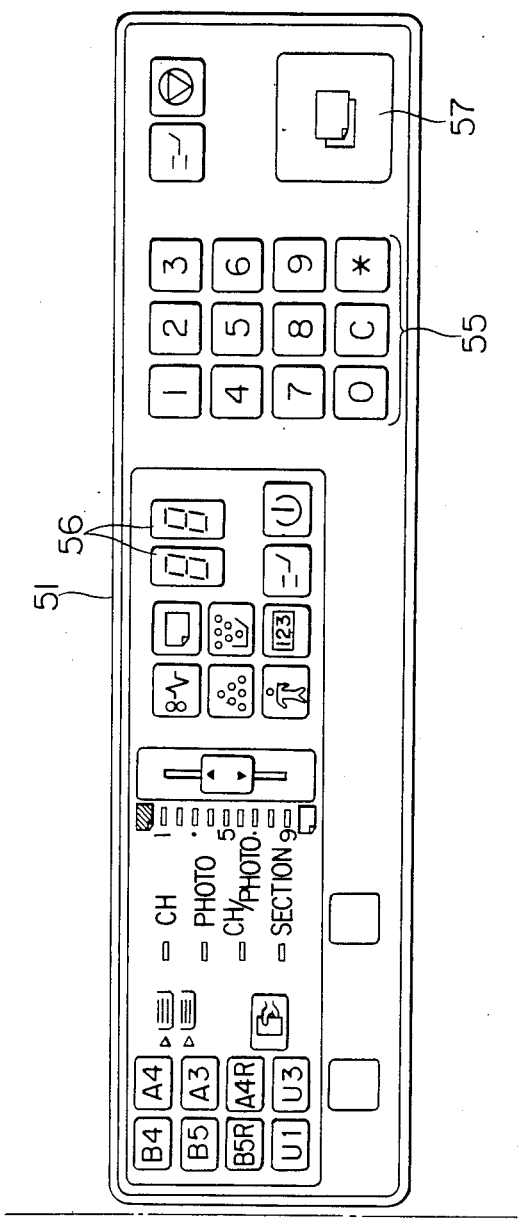

| FIG. 10A | FIG. 10B |

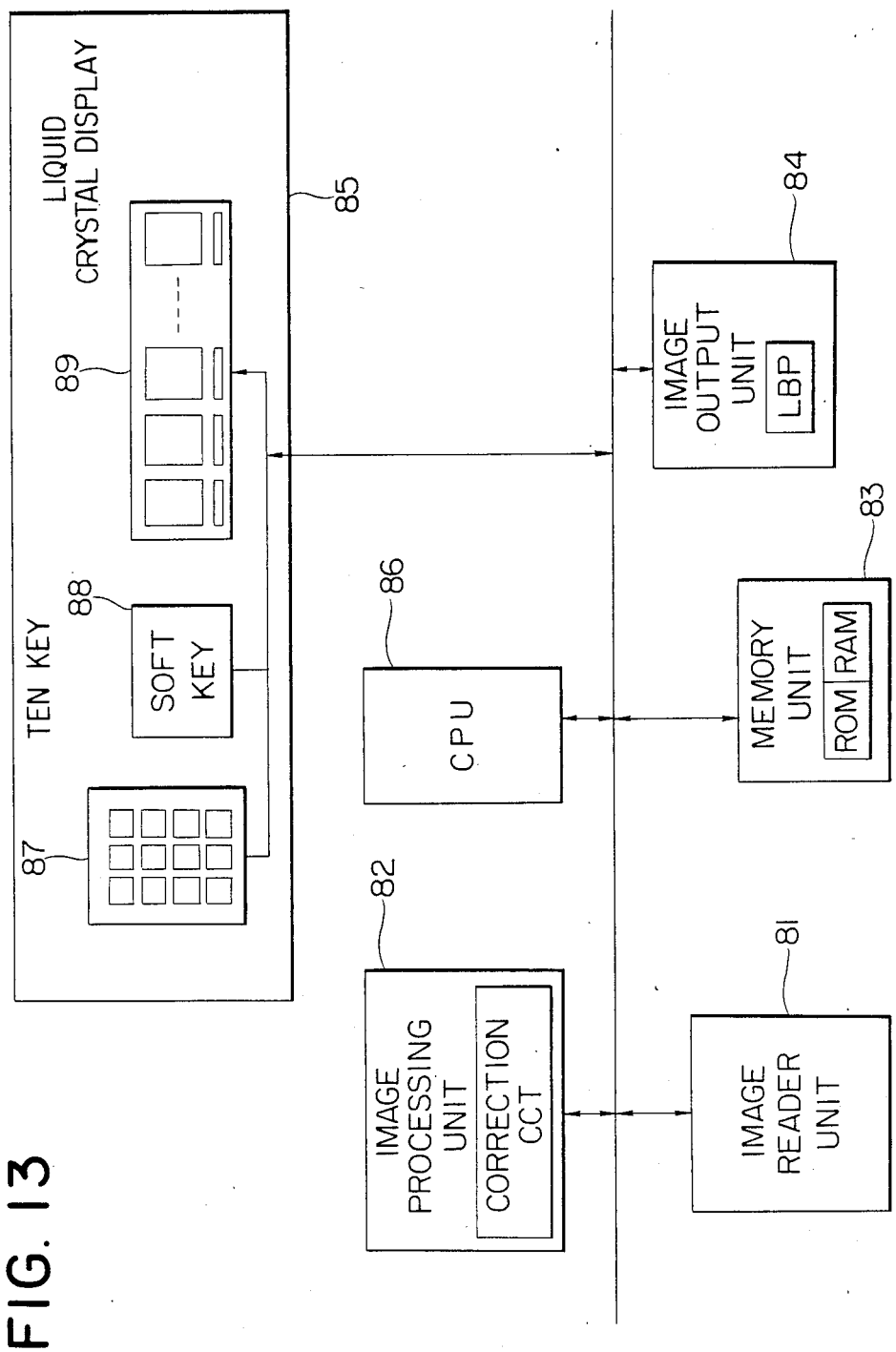

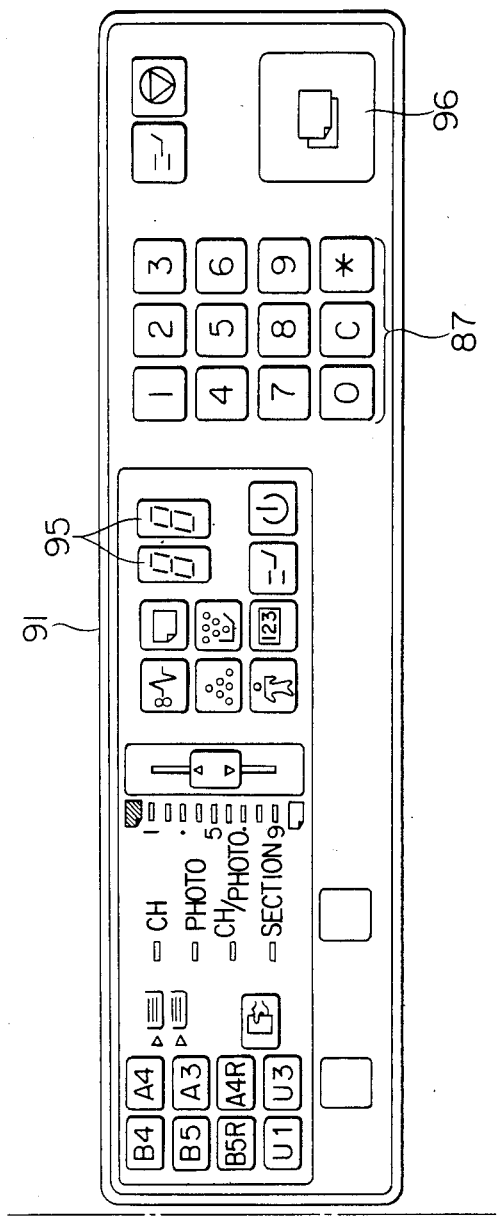

IMAGE READING APPARATUS

BACKGROUND OF THE INVENTION

1. Field of the Invention

The present invention relates to an image reading apparatus for photoelectrically reading an image and, more particularly, to an image reading apparatus using a plurality of image sensors.

2. Description of the Prior Art

Among conventional image reading apparatuses of this type, an image reading apparatus has been proposed wherein a plurality of CCD image sensor arrays each having a plurality of light-receiving elements are aligned along a main scan direction. In this image reading apparatus, unless the CCDs are properly aligned, the joint portions between every two adjacent CCDs have an overlapping portion or a portion not sensed by either CCD (an omitted portion). As a result, when a read image is reproduced, a stripe is formed at a portion corresponding to the joint of every two adjacent CCDs along a subscan direction, resulting in poor image reproduction.

A pixel pitch of the CCD is as small as several tens of microns, so it is difficult to align the CCDs with high precision. Properly aligned CCDs may be misaligned due to a mechanical impact when the image reading apparatus is moved from one place to another.

In order to prevent this, CCDs are conventionally aligned in the following manner.

The CCDs are aligned along the main scan direction such that image reading regions thereof partially overlap. Marks are formed at the overlap portions excluding the effective image reading region of the plurality of CCDs arranged as described above. These marks are read by the CCDs before scanning. As a result, an identical mark is read by two adjacent CCDs whose image reading regions overlap, so that the image signals therefrom can be used to calculate how many bits overlap. An image signal representing the overlapped bit component is electrically subtracted from each one-line image signal obtained by scanning an original. Therefore, image joint correction of the plurality of CCDs can be automatically performed.

However, according to this conventional automatic joint correction technique, the two CCDs must be aligned so that the amount of their overlap is in a predetermined range (e.g., 128 bits, i.e., 8 mm at a resolution of 16 pixels/mm). Such alignment is easier than aligning the CCDs along the main scan direction without overlapping or omission. However, high precision is still required in units of several millimeters. In addition to this disadvantage, when automatic joint correction cannot be performed due to misalignment of CCDs which is caused by a mechanical impact or the like while the image reading apparatus is being operated, the direction along which the CCDs are shifted is unknown. In addition, the displacement of the CCDs is also unknown. In order to determine the direction and the displacement of the CCDs, measuring equipment such as an oscilloscope is required, resulting in inconvenience. Correspondence between the respective bits of the CCDs and the reading locations cannot be accurately detected. For this reason, problems are presented, mainly in assembly and maintenance.

Furthermore, according to this conventional technique, when a plane with a joint mark is not optically aligned with an original surface, joint correction cannot be properly performed.

The focal point of the CCD is aligned with the original surface, so that the joint mark is read as an image which is out of focus. As a result, even if a corrected value (the number of bits of the overlap portion of the two adjacent CCDs) is calculated by an image signal representing the read joint mark, a desired joint correction cannot be performed, resulting in poor image reproduction.

SUMMARY OF THE INVENTION

The present invention has been made in consideration of the conventional drawbacks, and has as its object to provide an image reading apparatus which allows an operator to identify data from a joint portion of the image sensor.

It is another object of the present invention to provide an image reading apparatus for easily performing arrangement and adjustment of an image sensor and for optimally performing automatic joint correction of the read data.

It is still another object of the present invention to provide an image reading apparatus for producing an optimal image output in consideration of an influence of an optical positional error between a read original surface and a surface with joint marks when an image is read by a plurality of image sensors and is subjected to joint correction.

According to the present invention, the foregoing objects are attained by means of an image reading apparatus comprising reading means having a plurality of image sensors aligned along a main scan direction so as to read an overlapping region, a mark for discriminating the overlap reading region, and means for displaying a reading state of the sensors based on an output of the reading means, which output is obtained when the reading means reads the mark. Means for eliminating overlap image signals in accordance with signals obtained by reading the mark may also be provided, as may means for correcting operation of the eliminating means in accordance with a positional difference between the mark and the original.

In another aspect, the objects of the invention are attained by providing an image reading apparatus having reading means comprising a plurality of image sensors aligned along a main scan direction, means for eliminating image signals of a region overlappingly read by the sensors, and means for displaying status of the image signals of at least the region overlappingly read by the sensors.

In another aspect, the invention is directed to an image reading apparatus having reading means including a plurality of image sensors aligned along a main scan direction, means for discriminating a region overlappingly read by the sensors, means for eliminating image signals of the region so discriminated and means for correcting the opeation of the eliminating means.

The above and other objects, features and advantages of the present invention will be apparent from the following detailed description in conjunction with the accompanying drawings.

BRIEF DESCRIPTION OF THE DRAWINGS

FIG. 13 is a block diagram showing a circuit of an image reading apparatus according to a second embodiment of the present invention;

DETAILED DESCRIPTION OF THE PREFERRED EMBODIMENTS

The present invention will be described in detail with reference to the accompanying drawings.

Figure 1A:
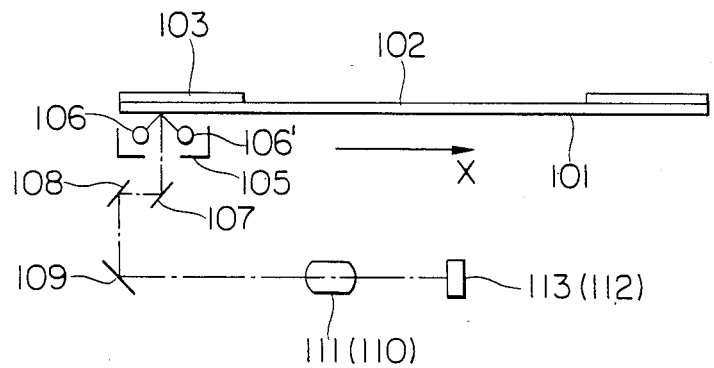
FIGS. 1A and 1B are respectively a side view and a plan view of an image reading apparatus to which the present invention is applied.
Figure 1B:
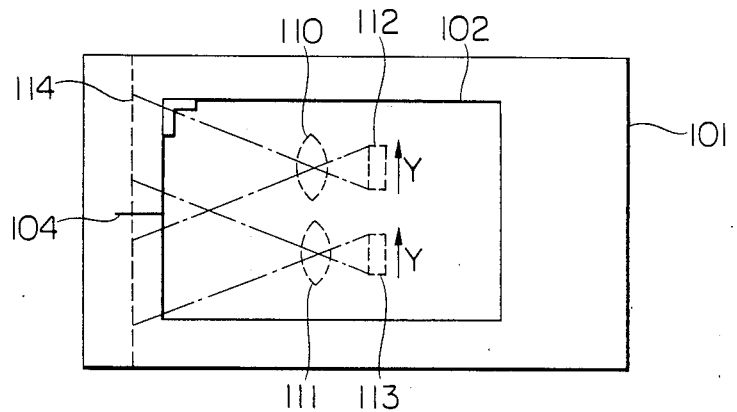

FIG. 1A is a side view of an image reading apparatus to which the present invention is applied, and FIG. 1B is a plan view thereof. Referring to FIGS. 1A and 1B, an original is placed on a glass plate 101. An effective image region 102 is defined by a white board 103 which corresponds to a noneffective image region. A 2-mm thin black line 104 for joint processing to be described later is formed at substantially the center of the lower surface of the white board 103. The white board 103 opposes the glass plate 101. Therefore, the white board 103 is aligned with the original surface. A light source 105 includes two fluorescent lamps 106 and 106' and is reciprocally moved together with a mirror 107 thereunder along rails (not shown) in the direction indicated by arrow X. Mirrors 108 and 109 can be reciprocated in synchronism with the light source 105 at a speed ½ that of the light source 105. Light rays from the fluorescent lamps 106 and 106' are reflected by the original or the white board 103 on the glass plate 101, and reflected light is incident on a pair of lenses 110 and 111 through the mirrors 107, 108 and 109. Light passing through the lens 111 is focused on an image sensor 113 of a pair of image sensors 112 and 113, and light passing through the lens 110 is focused on the image sensor 112. As shown in FIG. 1B, the image sensors 112 and 113 are arranged to read different image regions. However, these different image regions slightly overlap each other. A manual adjusting mechanism (not shown) is arranged to adjust the positions of the image sensors 112 and 113. For illustrative convenience, the mirrors 107, 108 and 109 shown in FIG. 1A are omitted in FIG. 1B. The thin black line 104 is formed at an overlap image reading region of the pair of image sensors 112 and 113.

The image sensors 112 and 113 are electrically scanned along the main scan direction in accordance with an intensity of incident light and read the image in units of lines. As previously described, the light source 105 is moved along the X-direction (the subscan direction), and the white board 103 and the entire surface of the original are read by the image sensors 112 and 113. The position of the light source 105 in FIG. 1A is called a home position. A dotted line 114 in FIG. 1B indicates a scanning line of the image sensors 112 and 113. Therefore, when the light source 105 is located in the home position, the white board 103 including the thin black line 104 is read by the image sensors 112 and 113. When the white board 103 is read, the light source 105 or the like is moved to read the document on the glass plate 101. An electrical signal is obtained and subjected to the necessary processing, thereby producing an image signal representing an original image.

Figure 2:
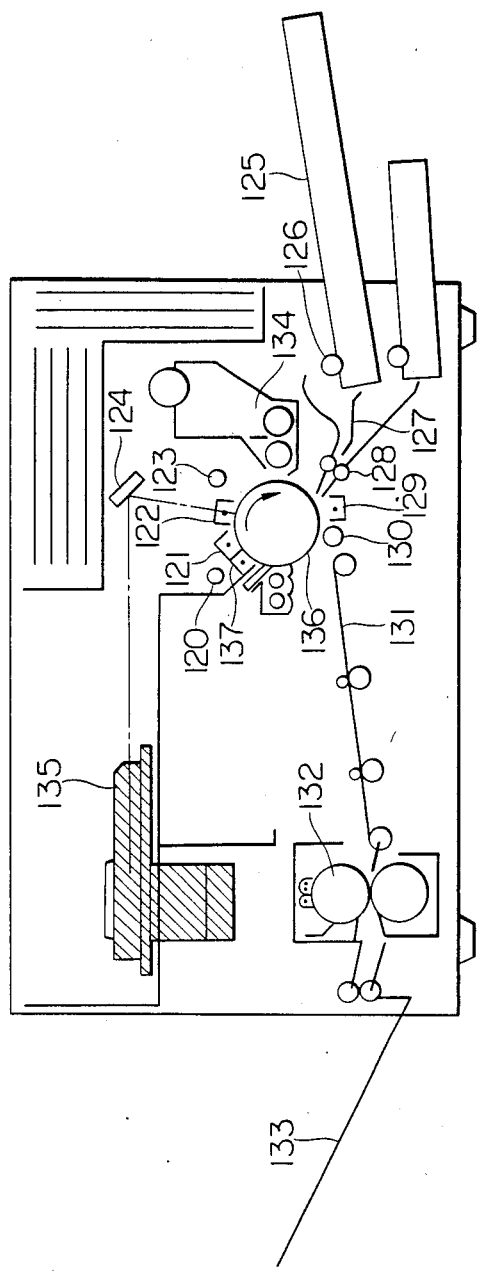
FIG. 2 is a longitudinal sectional view of a printer for performing printing in response to an image signal from the image reading apparatus shown in FIGS. 1A and 1B.

FIG. 2 shows a printer operated in response to an image signal from the image reading apparatus shown in FIGS. 1A and 1B. An image signal supplied from the image reading apparatus is supplied to a laser scan optical unit 135 in the printer. The unit 135 comprises a semiconductor laser, a collimator lens, a rotary polygonal mirror and an FΘ lens. The image signal is applied to the semiconductor laser which then generates a laser beam. The laser beam is collimated by the collimator lens and irradiates the polygonal mirror which is rotated at high speed, thereby scanning a photosensitive body 136 through a mirror 124. A latent image is thus formed on the photosensitive body 136.

The printer has process components around the photosensitive body 136. These process components are a predischarger 137, a predischarge lamp 120, a primary charger 121, a secondary charger 122, a front surface exposure lamp 123, a developing unit 124 for developing the latent image, a paper cassette 125, a pickup roller 126 for picking up a transfer sheet from the paper cassette 125, a paper guide 127, resister rollers 128, a transfer charger 129 for transferring an image from the photosensitive body 136 to the transfer sheet, a separation roller 130, a conveyor belt 131, a fixing unit 132, and a tray 133. The image is formed on the transfer sheet in accordance with the image signal.

The image reading apparatus shown in FIGS. 1A and 1B and the printer in FIG. 2 constituted a copying machine.

Figure 3:
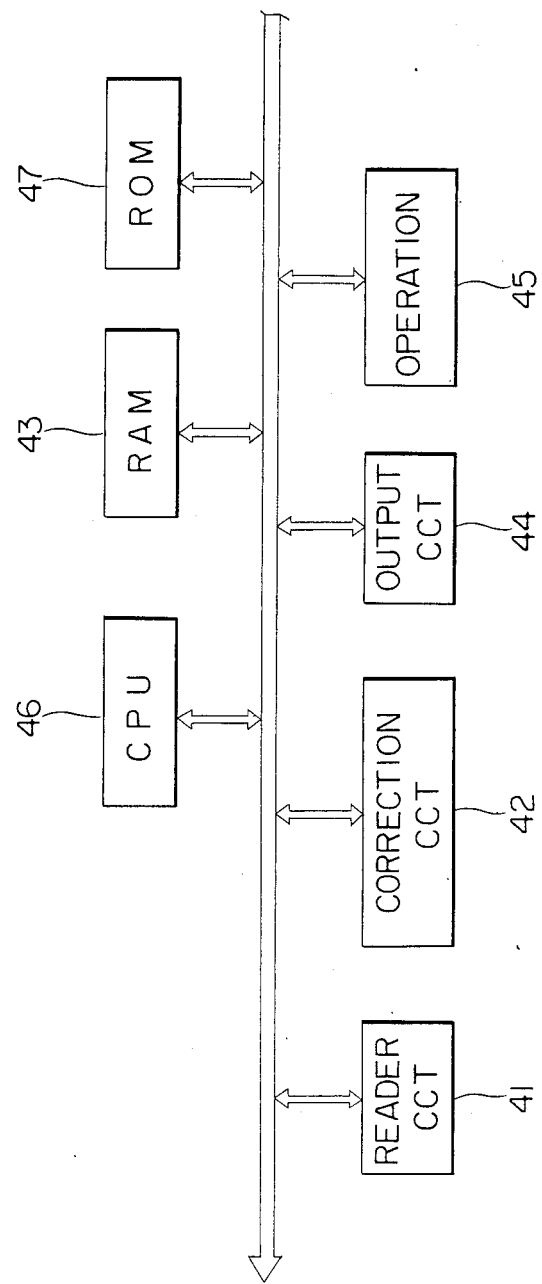
FIG. 3 is a block diagram of a copying apparatus according to the present invention.

FIG. 3 is a block diagram of a circuit of the copying machine to which the present invention is applied. The copying machine has the laser beam printer (of FIG. 2) as the output device. An image reader circuit 41 reads the original image using the two CCDs. A joint correction circuit 42 performs joint correction of the image data which is read by the two CCDs and which is supplied from the image reading apparatus of FIGS. 1A and 1B through the image reader circuit 41. The joint-correctd image data is temporarily stored in a memory (RAM) 43. The image data is then supplied from the RAM 43 to an image output circuit 44. Alternatively, the corrected image data from the joint correction circuit 42 is directly supplied to the image output circuit 44. In the image output circuit 44, the image data is printed by the laser beam printer (FIG. 2) as the recording means. An operation unit 45 is arranged at the upper surface panel of the image reading apparatus of FIGS.

1A and 1B and has an operation panel to be described later. Copy operation key inputs such as copy start operation are performed. A CPU 46 controls the entire operation in accordance with a control program stored in a ROM 47. A bus 48 exchanges data between the respective components.

The joint processing by the joint correction circuit 42 which includes a discriminating operation, and an eliminating operation to eliminate unwanted image signals, will be described with reference to FIGS. 4, 5 and 6.

Figure 4A:
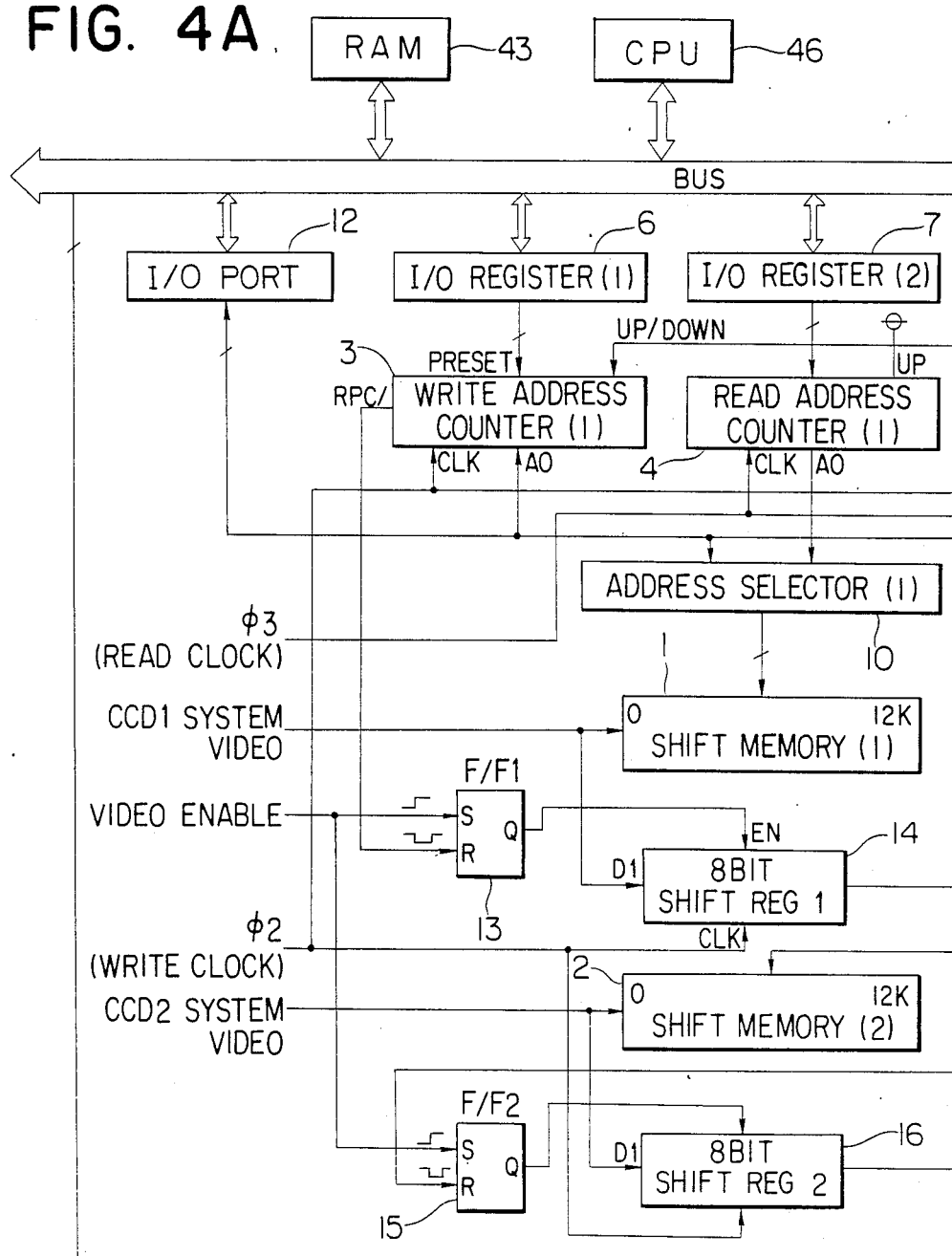
FIG. 4, composed of FIGS. 4A and 4B, is a block diagram of a joint correction circuit.

FIG. 4 shows the joint correction circuit 42 having two CCDs (CCD1 and CCD2) each of which consists of light-receiving elements of about 2,600 bits. A shift memory 1 comprises a static memory for storing image data from the CCD1. A shift memory 2 comprises a static memory for storing image data from the CCD2. A write address counter 3 comprises an address counter for generating address data for the shift memories 1 and 2. A read address counter 4 comprises an address counter for reading the data from the shift memory 1. Another read address counter 5 comprises an address counter for reading out the data from the shift memory 2. An address selector 10 selects one of the address signals from the address counters 3 and 4 so as to address the shift memory 1. An address selector 11 selects one of the address signals from the address counters 3 and 5 so as to address the shift memory 2. A shift register 14 extracts the CCD1 image data from the LSB in units of 8 bits. A shift register 16 comprises a register for extracting the CCD2 image data from the MSB in units of 8 bits. An F/F 13 comprises a flip-flop which is set at the leading edge of a VIDEO ENABLE signal representing an effective image interval for every line and which is reset in response to a ripple carry from the write address counter 3. The F/F 13 controls the input period of the shift resister 14. An F/F 15 comprises a flip-flop which is set at the leading edge of the VIDEO ENABLE signal and which is reset in response to a ripple carry from the read address counter 5. The F/F 15 controls the input interval of the shift register 16. An I/O port 12 is used to cause the CPU 46 to check the up-count of the write address counter 3. I/O registers 6 to 9 receive preset values from the CPU 46. The preset values from the I/O registers 6 to 9 are supplied to the write address counter 3 and the read address counters 4 and 5, respectively. The I/O register 8 is used to cause the CPU 46 to designate the up- or down-count mode of the write address counter 3 and the read address counter 5. The I/O register 8 is used to cause the address selectors 10 and 11 to select one corresponding count under the CPU 46. The I/O register 8 is used to supply a write or read clock to the read address counter 5. In addition, when joint correction is performed, the CPU 46 controls the supply of the one-line image data from the image reader circuit 41 to a shift memory in response to a TEST signal.

Joint processing of the image along the main scan direction in the image reader circuit 41 will be described.

Figure 5:
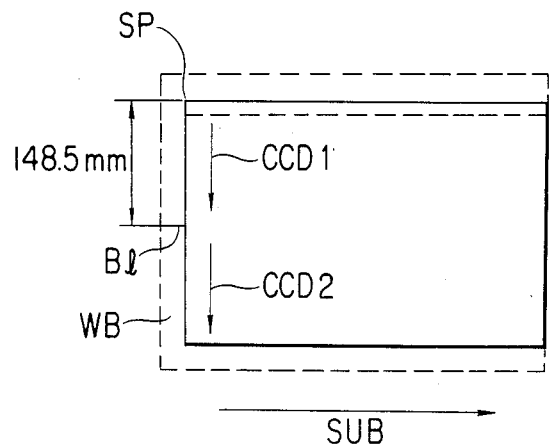
FIGS. 5 and 6 are respectively representations for explaining the operation of the joint correction circuit shown in FIG. 4.
Figure 6:
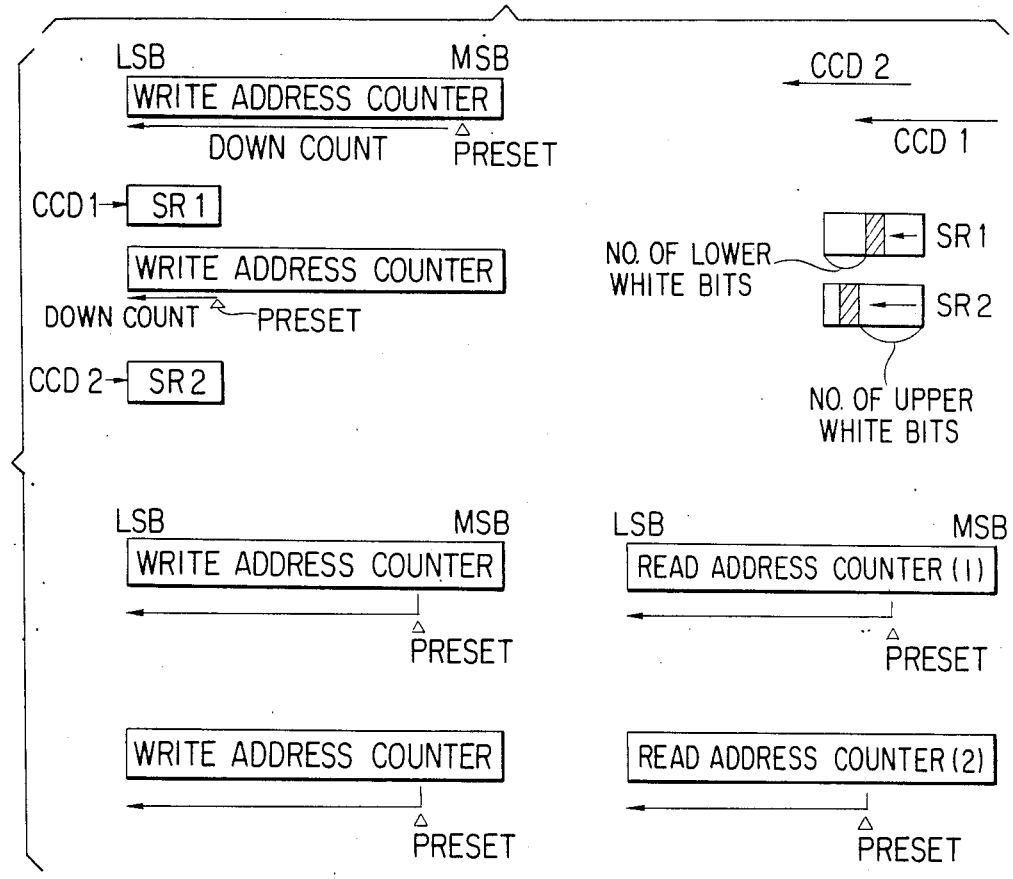

FIG. 5 illustrates an image region. A white board WB (corresponding to the white board 103 in FIGS. 1A and 1B) is disposed above the home position of the reader (optical system) in the entire main scan width. When the optical system is located in the home position and the light source is turned on, the white board WB is illuminated with light, and light reflected by the white board WB is incident on the CCDs. A thin black line Bl (corresponding to the thin black line 104 in FIG. 1B) having a width of 2 mm is formed at the center of the white board WB and extends along the subscan direction. The width of the thin black line can be an integer multiple of a threshold level for quantization. When the optical system is located in the home position and the light source is turned on, an image of the thin black line in a plurality of bits for the end portions of the two CCDs is produced. The signals from these CCDs are stored in the shift memories 1 and 2, respectively. The lower 128 bits of the CCD1 signal are compared with the upper 128 bits of the CCD2 signal. The CPU 46 checks that white bits always appear at the beginning and end of each 128 bits of data and that black bits are inserted between the white bits. Image data representing the sum of the CCD1 lower white bits, the CCD2 upper white bits, and black bits is subtracted from the image data read out from the CCD2 shift memory, thereby producing one-line image data without overlapping. It should be noted that CCD arrows indicate the main scan direction, and that a SUB arrow indicates the subscan direction in FIG. 5.

Joint correction processing will be described in more detail with reference to FIG. 6. In order to write the image signal therein, the shift memories 1 and 2 comprise a static RAM. Therefore, the write address counter (i.e., the write address counter 3) and the read address counters (the read address counters 4 and 5) are arranged accordingly. The amount of data stored in the CCD varies in accordance with a change in magnification/reduction ratio. In this embodiment, the CCD1 write address counter 3 is incremented from the LSB in response to a clock $\phi 2$, and the CPU 46 checks the count of the write address counter 3. This count CN is stored in the RAM 43 in the CPU 46. When the one-to-one copy mode is set, the count stops at the number (e.g., 2592) of pixels of the CCD1. In order to extract the CCD1 lower 8-bit data (the first bit obtained in main scanning is MSB) and the CCD2 upper 8-bit data, the count CN is set in the CCD1 write address counter 3, and 08H (hexadecimal 08) is set in the CCD2 address counter 5 so as to set the down count mode. On the other hand, as previously described, the 8-bit shift register is arranged to receive the image signals from the respective CCDs. The driving period of this shift register is started from the leading edge of the VIDEO ENABLE signal representing the main scan period of the CCD and is ended by the ripple carry from the counter (operated in response to clocks generated during the VIDEO ENABLE period). Therefore, the CCD1 shift register stores an image signal corresponding to the CCD1 lowest 8-bit data, and the CCD2 shift register stores an image signal corresponding to the CCD2 highest 8-bit data. These data left in the CCD1 and CCD2 shift registers are fetched by the CPU 46 and stored in the RAM 43 therein. In order to extract the CCD1 upper 9 to 16 bits and the CCD2 lower 9 to 16 bits, a count CN-8 is set in the CCD1 write address counter, and 10H is set in the CCD2 write address counter. The same read operation as described above is performed to obtain the desired data. This operation is repeated to store the CCD1 lower 128 bits and the CCD2 upper 128 bits in the memories, and the number of black bits, the number of CCD1 lower white bits and the number of CCD2 upper white bits are calculated. The image data corresponding to a sum of the CCD1 lower white bits, the CCD2 upper white bits and the black bits subtracted from the data read out from the CCD2 shift memory is calculated, thereby achieving joint correction along the main scan direction.

The operation of the shift memory in the original read operation after joint correction is completed will be described. When an image signal is written in the shift memories, the counts of the CCD1 and CCD2 write address counters are checked. The checked counts are set in the corresponding address counters. The counters are decremented to address the shift memories, respectively. When the data is read out from the shift memory, the reference position of the original along the main scan direction must be considered. As shown in FIG. 5, the document reference is a position spaced 148.5 mm apart from the center of the thin black line Bl (of 2-mm width). A start read address of the CCD1 shift memory is calculated by (the lower white bit number) +(the black bit number/2) +(148.5×16×magnification). The start read address of the CCD2 is calculated by (checked count)-(joint bit number). The CCD1 read address counter 4 is decremented in response to 4752 read clocks having a frequency of 13.89 KHz. When the count of the CCD1 read address counter becomes zero and generates a ripple carry, the CCD2 read address counter 5 is decremented. The above operation is repeated for every read line. In this manner, automatic joint correction of the signals from the plurality of CCDs can be performed.

Figure 7A:
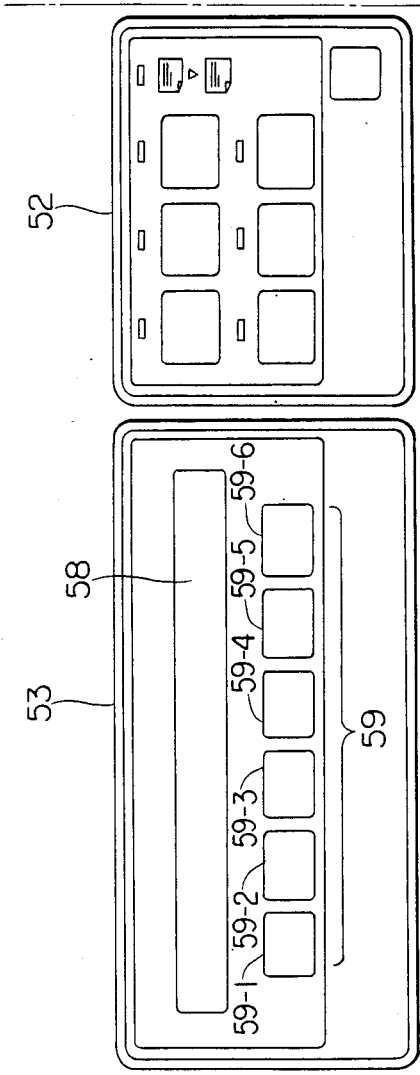
FIG. 7, composed of FIGS. 7A and 7B, is a plan view showing an operation panel.

FIG. 7 shows an operation panel in this embodiment. The operation panel is arranged on an upper panel of the image reading apparatus and comprises a normal operation unit 51, a present operation unit 52 and a special operation unit 53.

The normal operation unit 51 has ten keys 55, a display 56, a copy start key 57 and the like which has the same function as in a conventional copying machine.

The preset operation unit 52 has an entry function of copy conditions set in the normal and special operation units 51 and 53. For example, frequently used copy conditions are stored in the RAM 43. In this case, the desired copy conditions are read out by a single key input operation from the RAM 43 so as to preset the copying conditions.

Figure 8:
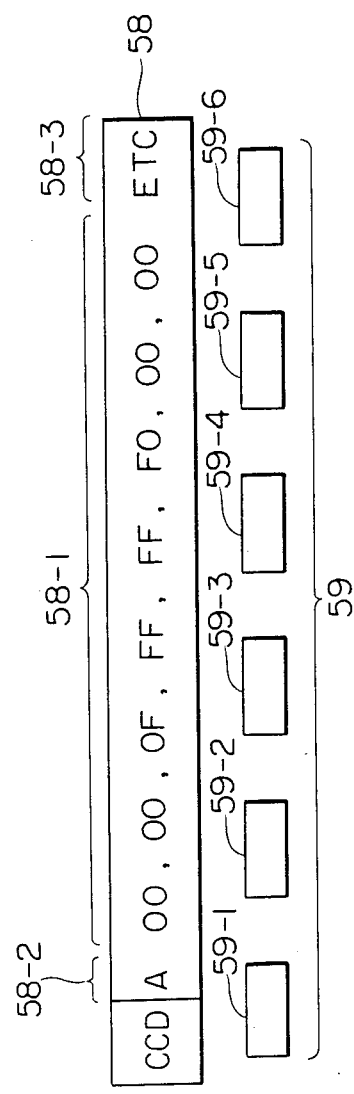
FIG. 8 is a representation showing a special operation unit in the operation panel shown in FIG. 7.

The special operation unit 53 has a 20-digit liquid crystal display section 58 and 6 soft keys 59 (59-1 to 59-6) and has a display function of the read image data representing an overlap portion of the two CCDs. More particularly, as shown in FIG. 8, upon depression of the data display request key 59-5, the read image data (to be referred to as joint data hereinafter) of the overlap portion is displayed on the display 58. In this embodiment, hexadecimal display is performed. In other words, 4-bit data is displayed as one character. Thus, 64-bit joint data can be displayed on the 16-digit display element 58-1. It should be noted that "0" indicates a white image and that "1" indicates a black image. As previously described, the joint data of the two adjacent CCDs comprises 256 bits (128 bits×2). In this embodiment, the joint data is divided into four components which are displayed in a divided manner. For this reason, the leftmost digit of the display 58 indicates, as a message, which portion of the joint data is displayed on the display element 58-2.

Figure 9:
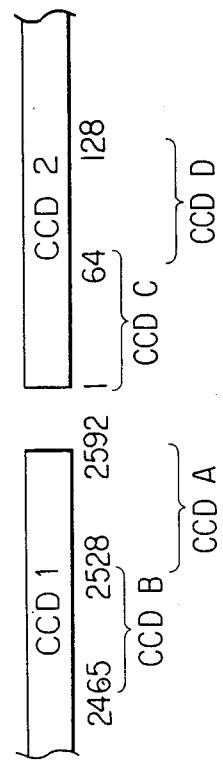
FIG. 9 is a representation showing the correspondence between displayed joint data.

FIG. 9 shows the correspondence between the type of message and the joint data. A message CCD"A" corresponds to the CCD1 lower 64-bit data consisting of the 2592nd to the 2529th bits, and a message CCD"B" corresponds to the CCD1 lower 64-bit data consisting of the 2528th to the 2465th bits. Similarly, a message CCD"C" corresponds to the CCD2 upper 64-bit data consisting of the 1st to the 64th bits, and a message CCD"D" corresponds to the CCD2 upper 64-bit data consisting of the 65th to 128th bits.

Referring to FIG. 8, display switching of four 64-bit joint data is performed upon depression of the display selection key 59-6 arranged under "ETC" displayed on the 3-digit display element 58-3. In this embodiment, every time the display selection key 59-6 is depressed, the display changes in an order of CCD"A", CCD"B", CCD"C", CCD"D" and CCD"A".

In the display example in FIG. 8, the CCD1 joint data from the 2592nd bit to the 2529th bit are sequentially displayed from the right side. As is apparent from FIG. 8, 20-bit data from the 2592nd bit to the 2573rd bit indicate white image data, and the next 24-bit data from the 2572nd bit to the 2549th bit indicate black image data. The subsequent bits indicate white image data. The joint mark, i.e., the thin black line Bl is represented by data from the 2572nd bit to the 2549th bit. In this manner, the thin black line position can be checked in units of 4 bits. Therefore, when the resolution is given to be 16 pixels mm, the thin black line position can be discriminated in units of 0.25 mm.

In the special operation unit 53 for displaying the joint data, the contents displayed on the display 58 can be selected by using the soft keys 59-1 to 59-4. For example, a desired paper size and a desired magnification among the displayed paper sizes and magnifications which are sequentially displayed on the liquid crystal display can be selected by the soft keys.

Figures 10, 10B:
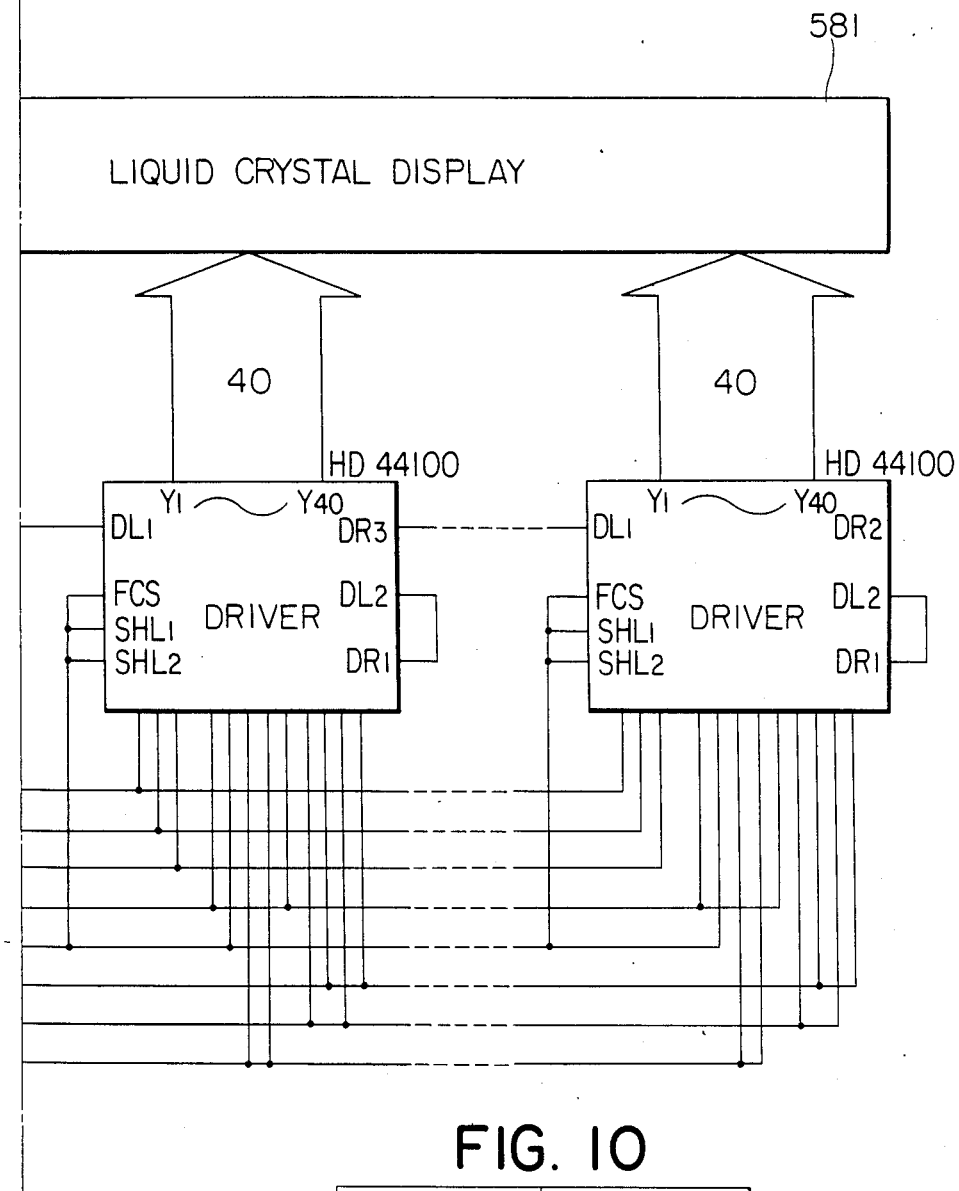
FIG. 10, composed of FIGS. 10A and 10B, is a block diagram of a liquid crystal display section in the special operation unit.
Figure 10A:
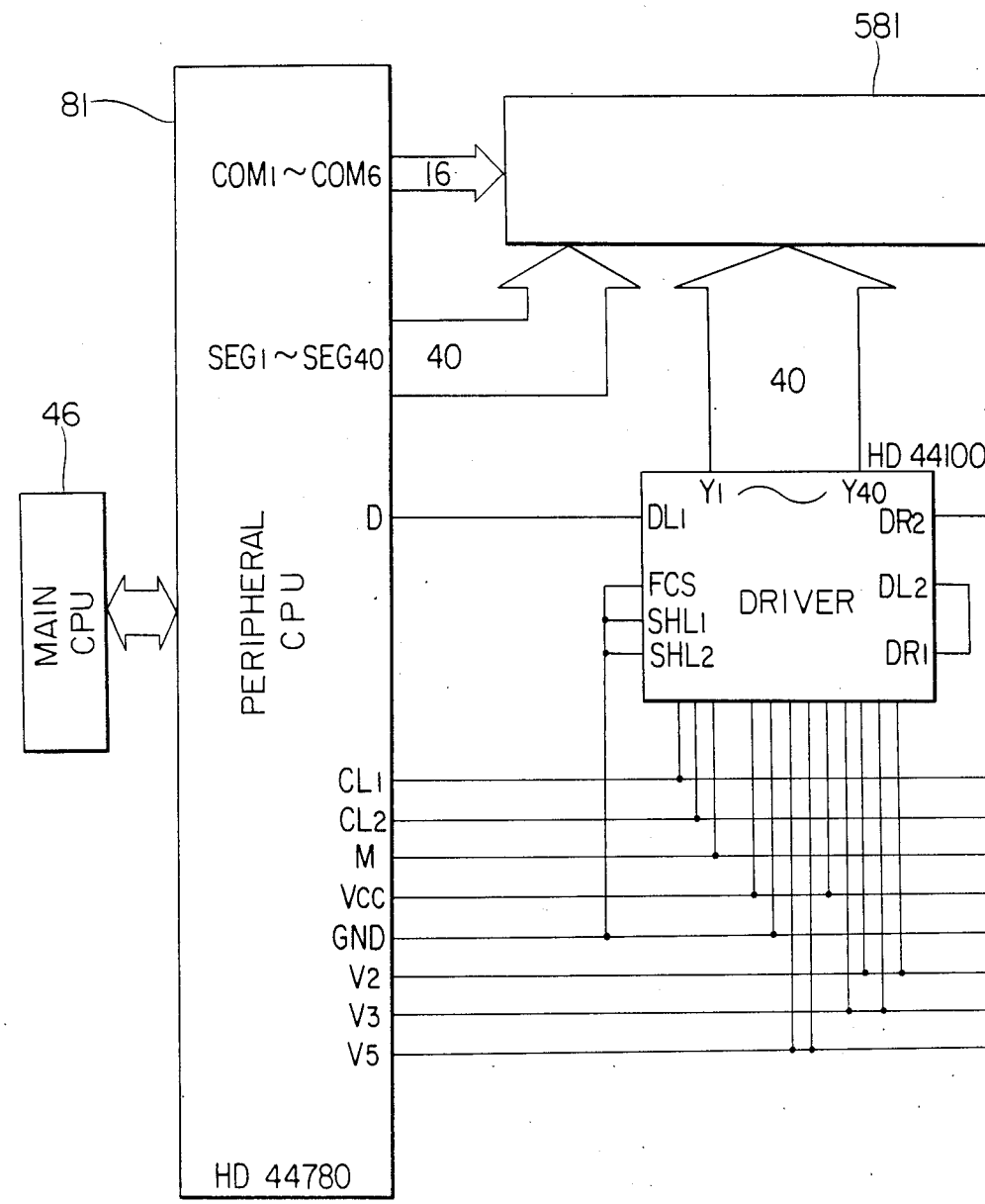

FIG. 10 shows the arrangement of the liquid crystal display section 58. A peripheral CPU 81 is connected to a 20-digit 7-segment liquid crystal display 581. A required number of liquid crystal displays 581 is provided.

Figure 11:
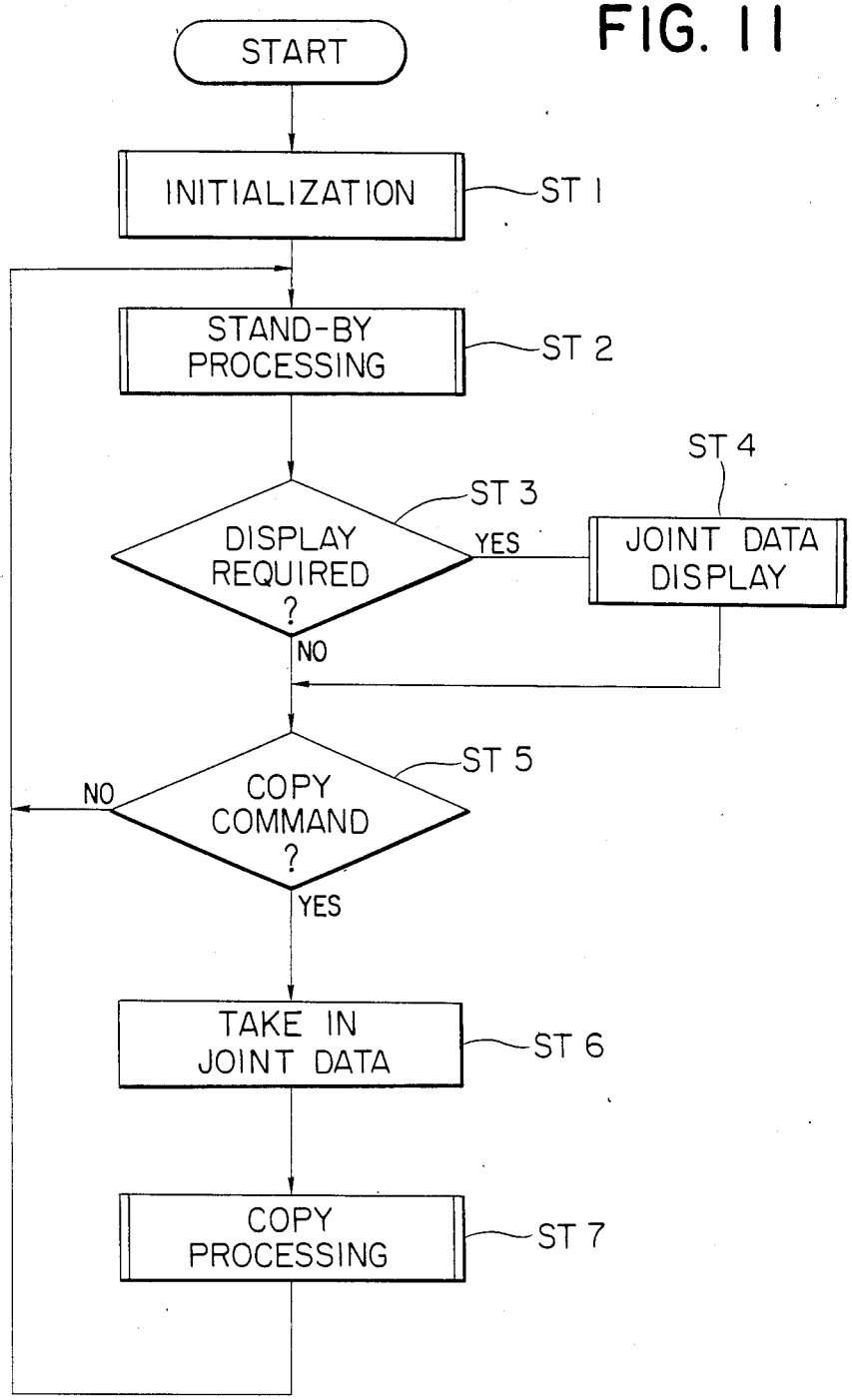
FIG. 11 is a flow chart for schematically explaining the operation of the circuit shown in FIG. 3.

FIG. 11 is a flow chart for explaining the operation of the apparatus of this embodiment. Referring to FIG. 11, initialization of the apparatus is performed in step ST1. In step ST2, standby processing such as copying magnification setting is performed. The CPU checks in step ST3 whether or not a joint data display is requested. When the display request is present upon depression of the data display request key 59-5, the flow advances to step ST4. The joint data stored in the RAM 43 is displayed on the liquid display section 58. As previously described, the desired 64-bit data specified by the selection key 59-6 is displayed. In the state immediately after the apparatus is energized, no joint data is stored in the RAM 43. In this case, even if the display request is present, no data is displayed.

The CPU checks in step ST5 whether or not a copy command is generated. If YES in step ST5, the 256-bit joint data among the image data read out from the CCD1 and CCD2 is fetched in the RAM 43. In step ST7, copy processing is performed.

As has been described, when an image is read by a plurality of image sensors and joint correction of images read by the image sensors is automatically performed, joint data at the overlap portion of the image regions of the image sensors is displayed, so that the spatial positions of the plurality of image sensors can be discriminated, and the following effects can be thereby obtained.

(1) In order to arrange image sensors, an optimal overlap portion of the two adjacent image sensors can be easily set.

(2) Even when automatic joint correction cannot be performed due to mechanical misalignment of the image sensors, the alignment of the image sensors can be easily performed.

In the above embodiment, the hexadecimal display is adopted to display the joint data. However, the present invention is not limited to this display mode, but can be extended to a dot display mode or a binary display mode in consideration of the relationship between the display mechanism, the display space and the like.

In the above embodiment, the display range of the read data of the CCD is given such that the CCD1 lower 128-bit data and the CCD2 upper 128-bit data are displayed. However, any desired number of bits can be displayed in accordance with a memory capacity of the RAM 43 and the number of bits of the joint data.

Furthermore, the number of display bits corresponds to that of the CCD data bits. However, the display range may be varied. For example, when a preset value of the write address counter 3 (FIG. 4) which corresponds to the display location can be entered at the operation section, the display range can become variable. For example, defective bits of the CCD and poor image quality can be easily discriminated to provide better results in service and maintenance.

The display section may comprise an LED display array in place of the liquid crystal section. Alternatively, the display data may be printed out.

Furthermore, a joint data display may be arranged independently of the operation unit.

In the image reading apparatus shown in FIGS. 1A and 1B, the white board with the thin black line as a reference for joint correction is aligned with the surface of the original to be read. However, the white board cannot be often aligned with the original surface.

Figure 12:
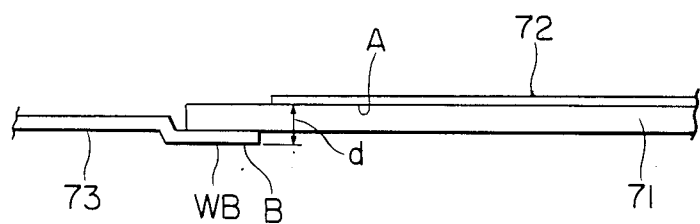
FIG. 12 is a partial sectional view showing a positional error between the original surface and the surface with joint correction marks.

FIG. 12 shows such a case wherein the white board cannot be aligned with the original surface. Referring to FIG. 12, the sectional view of the original table is illustrated. An image surface A of an original 72 placed on a glass original table 71 is misaligned by a distance d from a surface B of a white board WB with a joint correction mark. The distance d corresponds to a sum of the thickness of the original table 71 and the thickness of the white board WB.

The focal point of the CCD is aligned with the surface A, so the nonfocused image of the joint correction mark is read. As a result, even if joint correction is performed by calculating a correction value (the number of bits of the overlap portion of the two adjacent CCDs) in accordance with the image signal of the joint overlap mark, desired joint correction is not performed in the output image, resulting in poor image reproduction.

A second embodiment will be described wherein proper joint correction is performed even in the arrangement described above.

FIG. 13 is a block diagram of a circuit of a copying machine according to the second embodiment of the present invention. The copying machine adopts a laser beam printer as the output device in the same manner as in the first embodiment. Referring to FIG. 13, an image reader unit 81 reads the image using two CCDs in the same manner as in the first embodiment. In the reader unit 81, an optical positional error between the original surface and the surface with a joint correction mark is given to be d, as shown in FIG. 12. An image processing unit 82 has the same joint correction circuit as in FIG. 4. The image processing unit 82 performs joint correction of the image data supplied from the image reader unit 81 consisting of the two CCDs. The joint correction operation is performed in the same manner as in FIGS. 4 to 6. In this embodiment, the following joint correction value is calculated from the image data which is supplied from the joint correction circuit and which is stored in a RAM in a memory unit 83.

In the same manner as in the first embodiment, the CCD1 lower 128-bit data and the CCD2 upper 128-bit data are stored in the RAM. The CCD1 lower white bits, the CCD2 upper white, and black bits which are the bits of the overlap portion of the CCD1 and CCD2 are calculated and added to obtain a sum. The sum is stored as a first joint correction value in the RAM. Furthermore, an offset value for eliminating the influence caused by the optical positional error d is prestored in the RAM. The first joint correction value is corrected in accordance with the offset value to obtain image data corresponding to a second joint correction value (in bits). The second joint correction value is then subtracted from the data from the CCD2 shift memory in units of lines, thereby achieving joint correction along the main scan direction.

The joint-corrected image data is supplied to an image output unit 84 directly or after being temporarily stored in the RAM in the memory unit 83. The image output unit 84 prints the image at the laser beam printer as the recording means in accordance with the joint-corrected image data. An operation unit 85 has ten keys 87, soft keys 85 and a liquid crystal display 89. The soft keys 85 are selectively operated to set an offset value input mode. The ten keys 87 are selectively operated to enter the offset value. The entered offset value is stored in the memory unit 83. A CPU 86 controls the respective components described above in accordance with a control program stored in a ROM in the memory unit 83.

Figure 14A:
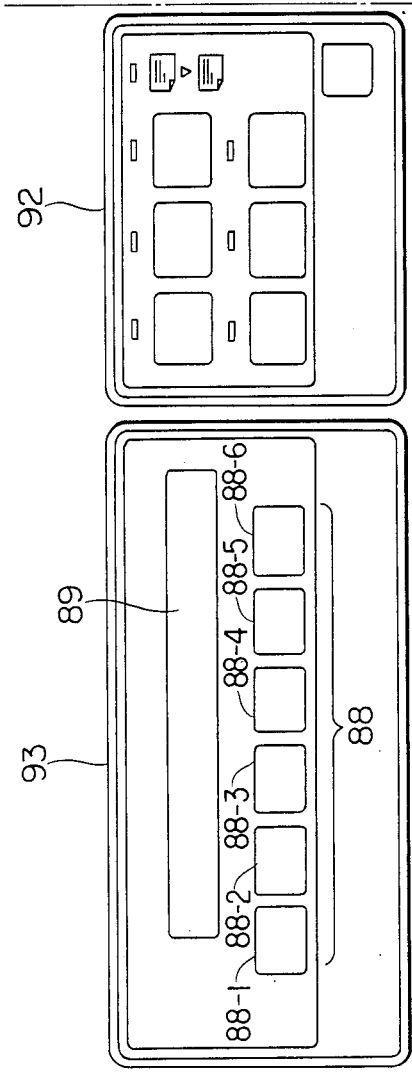
FIG. 14, composed of FIGS. 14A and 14B, is a plan view showing a control panel in the apparatus shown in FIG. 13.

FIG. 14 shows a control panel according to the second embodiment. The control panel has a normal operation unit 91, a preset operation unit 92 and a special operation unit 93.

The normal operation unit 91 has the ten keys 87 for entering a preset copy number and a joint correction offset value, a preset copy number display element 95, a copy start key 96 and the like. These elements have the same function as those of a conventional copying machine.

The preset control unit 92 has an entry function for entering copy conditions to be set in the normal and special operation units 91 and 93. For example, frequently used copy conditions are stored in the RAM. In this case, the desired copy conditions are read out by a single key input operation from the RAM so as to preset the copying conditions.

The special operation unit 93 has the liquid crystal display 89 and six soft keys 88 (88-1 to 88-6). The offset value setting mode is set upon depression of the soft key 82-1, so that an offset value can be entered with the ten keys 87. When one of the soft keys 88-2 to 88-6 which is located immediately under a portion corresponding to a desired display on the liquid crystal display 83 is depressed, the desired content is displayed. For example, paper size data are sequentially displayed on the display, and a desired paper size can be displayed when the corresponding soft key is depressed. The contents which cannot be displayed on the normal operation unit 71 are displayed on the liquid crystal display 89. For example, the number of printers used during copy operation, the paper size and the magnification can be displayed on the liquid crystal display 89.

Figure 15:
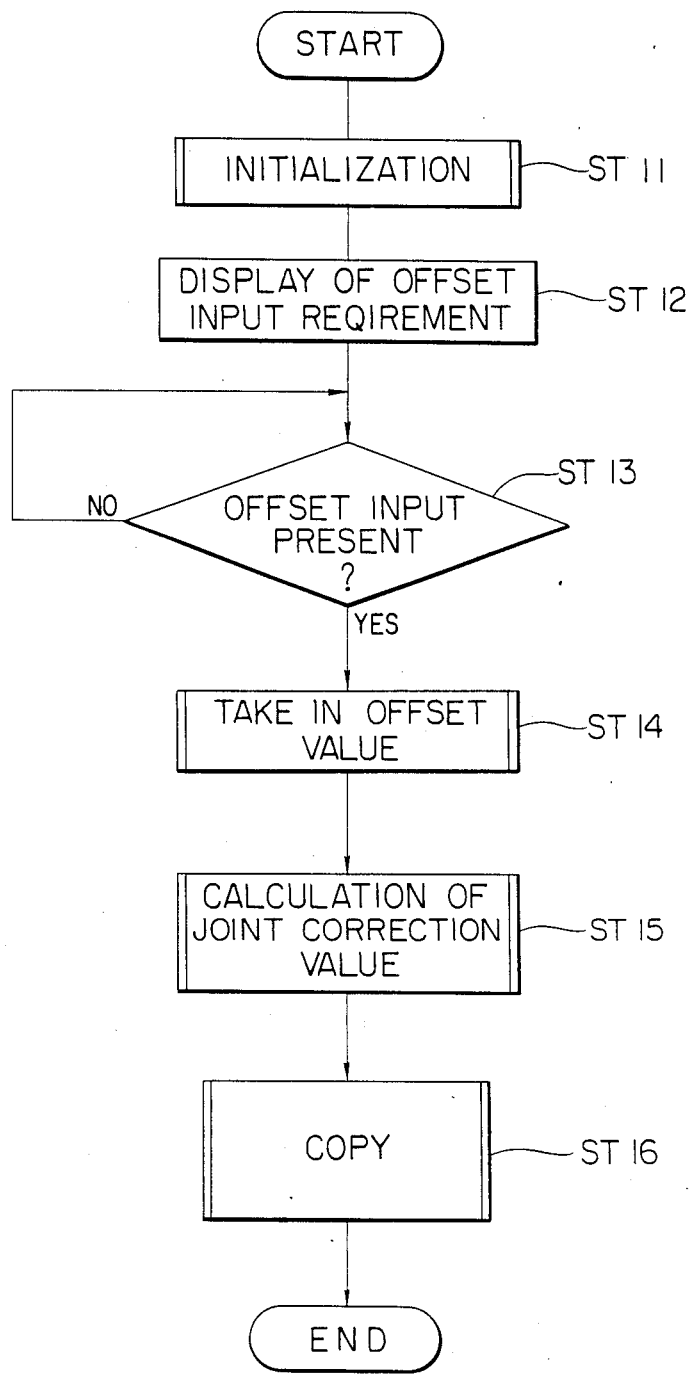
FIG. 15 is a flow chart for explaining the operation of the circuit shown in FIG. 13.

FIG. 15 shows the overall operation of the apparatus according to the second embodiment. Referring to FIG. 15, in step ST11, the apparatus is initialized. In step ST12, an offset input requirement for joint correction is displayed on the liquid crystal display 89. When the offset input is entered in step ST13, the flow advances to step ST14. The entered offset value is stored in the RAM. In step ST15, a joint correction value is calculated. In step ST16, the copy sequence is initiated. In this embodiment, when the offset value need not be entered, "0" is entered. However, when the offset value is updated during copy operation, the soft key 88-1 is depressed to set the offset value input mode. Thereafter, a desired offset value is entered with the ten keys 87.

In addition to the joint correction offset value setting means, any other means may be used. Mainly, there are two types of joint correction offset value setting means:

(1) a hardware means such as a DIP switch or a rotary switch, and (2) a software means such as a key input at an operation unit in the same manner as the above embodiment.

The offset value is determined by the optical positional error d between the original surface A and the surface B with the joint mark, as shown in FIG. 12. The offset value is thus determined solely as a value inherent to the apparatus. In general, when a distance between the CCD and the original surface A is longer than that between the CCD and the surface B, the offset value is determined to increase the first correction value (the number of bits of the overlap portion between the CCDs). Otherwise, the offset value is determined to decrease it.

In the above embodiment, the offset value is entered every time the apparatus is powered. Therefore, the offset value can be determined solely by characteristics inherent to the apparatus. For this reason, the RAM for storing the offset value is backed up by another power supply, or a nonvolatile memory is used as the RAM for storing the offset value. In this case, even if the apparatus is powered off, the stored offset value can be retained. Therefore, the offset value is stored once in the static RAM at the time of shipment.

The thin black line is used for joint processing in the above embodiments. However, a predetermined pattern having a plurality of lines, or a thick black line may be used in place of the thin black line. The present invention can also be applied to the reading apparatus having at least three CCDs.

In the above embodiments, the resultant image is printed at the laser beam printer. However, the image signal may be stored in an image file or may be transmitted to a remote area through a transmitting means.

As has been apparent from the above description, when joint correction of the image read by a plurality of image sensors is performed, the influence caused by an optical positional error between the original surface and the surface with the joint correction mark can be eliminated to perform proper joint correction. Therefore, optimal joint correction can be constantly performed to produce a high quality image output.

What is claimed is:

1. An image reading apparatus for photoelectrically reading an original image, comprising:
   image reading means comprising a plurality of image sensors aligned along a main scan direction so as to read an overlapping region;
   a mark used for discriminating the overlap reading region of said plurality of image sensors; and
   display means for displaying a reading state of said plurality of image sensors based on an output of said image reading means, which output is obtained when said image reading means, which output is obtained when said image reading means reads said mark.

2. An apparatus according to claim 1, wherein said mark is arranged outside an area for placing an original to be read.

3. An apparatus according to claim 1, wherein said image reading means reads the image of the original after said mark is read.

4. An apparatus according to claim 1, further comprising discriminating means for discriminating the overlap reading region in accordance with a mark signal from each of said plurality of image sensors.

5. An apparatus according to claim 4, further comprising eliminating means for eliminating an overlap image signal from an image signal from said image reading means in accordance with a discrimination result of said discriminating means.

6. An apparatus according to claim 1, wherein said display means displays read data of a predetermined area including said mark.

7. An apparatus according to claim 6, wherein said display means is adapted to display the read data of the predetermined area at intervals of a predetermined size on a division basis.

8. An image reading apparatus for photoelectrically reading an image of an original, comprising:
   image reading means comprising a plurality of image sensors aligned along a main scan direction so as to read an overlapping region;
   a mark used for discriminating the overlap reading region of said plurality of image sensors;
   eliminating means for eliminating overlap image signals from image signals obtained by means of reading the original image by said image reading means in accordance with mark signals obtained by means of reading said mark by said image reading means; and
   correcting means for correcting the eliminating operation of said eliminating means in accordance with a positional difference between said mark and the original.

9. An apparatus according to claim 8, further comprising setting means for setting a correction value for the correcting operation of said correcting means.

10. An apparatus according to claim 9, further comprising storage means for storing the correction value set by said setting means.

11. An apparatus according to claim 8, wherein the original is supported on a plane different from said mark.

12. An apparatus according to claim 8, wherein said image reading means reads the image of the original after said mark is read.

13. An apparatus according to claim 8, wherein said eliminating means includes memory means for storing the image signals from said image reading means, and controls reading out of the image signals from said memory means.

14. An image reading apparatus for photoelectrically reading an original image, comprising:
   image reading means comprising a plurality of image sensors aligned along a main scan direction;
   eliminating means for eliminating image signals of a region overlappingly read by said plurality of image sensors from image signals obtained by means of reading the original image by said image reading means: and display means for displaying status of the image signals of at least the region overlappingly read by said plurality of image sensors.

15. An apparatus according to claim 14, further comprising discriminating means for discriminating the region overlappingly read, wherein said eliminating means eliminates the image signals of the region detected by said detecting means.

16. An apparatus according to claim 15, further comprising a marker used for discriminating the region overlappingly read.

17. An apparatus according to claim 14, wherein said eliminating means includes memory means for storing the image signals from said image reading means, and controls reading out of the image signals from said memory means.

18. An apparatus according to claim 14, wherein said display means displays a level of each of the image signals.

19. An apparatus according to claim 14. wherein said display means is adapted to display status of the image signals at intervals of a predetermined amount on a division basis.

20. An image reading apparatus for photoelectrically reading an image of an original, comprising:

image reading means including a plurality of image sensors aligned along a main scan direction;

discriminating means for discriminating a region overlappingly read by said plurality of image sensors in accordance with signals derived from said plurality of image sensors;

eliminating means for eliminating image signals of the region discriminated by said discriminating means from image signals obtained by said image reading means; and correcting means for correcting the amount of image signals to be eliminated by said eliminating means.

21. An apparatus according to claim 20, wherein said eliminating means includes memory means for storing the image signals from said image reading means, and controls reading out of the image signals from said memory means.

22. An apparatus according to claim 20, further comprising a marker used for discriminating the region overlappingly read.

23. An apparatus according to claim 22, wherein the original is supported on a plane different from said mark.

24. An apparatus according to claim 22, wherein said image reading means reads the image of the original after said mark is read.

25. An apparatus according to claim 20, further comprising setting means for setting a correction value for the correcting operation of said correcting means.

26. An apparatus according to claim 25, further comprising storage means for storing the correction value set by said setting means.

* * * * *